(12) United States Patent
Kang et al.

(10) Patent No.: US 10,068,278 B2
(45) Date of Patent: Sep. 4, 2018

(54) SYSTEM AND METHOD FOR PURCHASING MERCHANDISE BASED ON RADIO FREQUENCY RECOGNITION

(71) Applicant: SK PLANET CO., LTD., Seongnam-si, Gyeonggi-do (KR)

(72) Inventors: Ki Chon Kang, Seoul (KR); Jae Hyung Huh, Seongnam-si (KR)

(73) Assignee: SK PLANET CO., LTD., Seongnam-si (KR)

( * ) Notice: Subject to any disclaimer, the term of this patent is extended or adjusted under 35 U.S.C. 154(b) by 471 days.

(21) Appl. No.: 14/491,139

(22) Filed: Sep. 19, 2014

(65) Prior Publication Data

US 2015/0254755 A1 Sep. 10, 2015

(30) Foreign Application Priority Data

Mar. 7, 2014 (KR) ........................ 10-2014-0027133

(51) Int. Cl.
*G06Q 30/06* (2012.01)
*G06Q 20/32* (2012.01)
*G06Q 20/20* (2012.01)
*H04B 5/00* (2006.01)

(52) U.S. Cl.
CPC ......... *G06Q 30/0633* (2013.01); *G06Q 20/20* (2013.01); *G06Q 20/3278* (2013.01)

(58) Field of Classification Search
USPC .......................................... 705/21
See application file for complete search history.

(56) References Cited

U.S. PATENT DOCUMENTS

| 8,630,584 | B2 * | 1/2014 | Yu ........................ H04M 1/7253 340/5.8 |
| 2004/0029564 | A1 * | 2/2004 | Hodge ................... H04M 1/67 455/411 |
| 2012/0075148 | A1 * | 3/2012 | Cho ................... G06K 19/0723 343/702 |

* cited by examiner

*Primary Examiner* — Oger Garcia Ade
(74) *Attorney, Agent, or Firm* — Brinks Gilson & Lione

(57) ABSTRACT

A system and a method for purchasing merchandise based on radio frequency recognition are disclosed. The merchandise purchasing system includes: a RF device which outputs a radio frequency (RF) signal containing store information; a user terminal which stores a purchasing wish list input from a user through a merchandise purchasing application, receives the RF signal transmitted from the RF device, checks whether or not a merchandise marching the store information acquired through the RF signal exists on the purchasing wish list, and requests for a payment process for the merchandise; a service server which performs a payment process for the user terminal and transmits payment information to a POS terminal located at a corresponding store; and a POS terminal which receives and displays the payment information.

5 Claims, 7 Drawing Sheets

SYSTEM AND METHOD FOR PURCHASING MERCHANDISE BASED ON RADIO FREQUENCY RECOGNITION

CROSS-REFERENCE TO RELATED APPLICATION

This application claims the benefit of Korean Application No. 10-2014-0027133, filed on Mar. 7, 2014, with the Korean Intellectual Property Office, the disclosure of which is incorporated herein by reference.

BACKGROUND OF THE INVENTION

Field of the Invention

The present invention relates to a RF recognition-based merchandise purchasing system and method and more particularly, to a system and method which is capable of implementing a service for allowing a user to create a merchandise purchasing wish list through an application installed in a user terminal, performing a payment process for a merchandise on the purchasing wish list when a user enters a store selling the merchandise, and delivering the merchandise to the user.

Description of the Related Art

With recent rapid spread of mobile terminals, a certain number of purchasing/payment services using mobile terminals have been introduced. In particular, high convenience in interlock with store sales systems (for example, POS (Point Of Sales) systems) is of main concern.

A POS system is a sales management system which manages sales information intensively by recording information on sold merchandises in-situ. That is, the POS system is a general sales management system which doubles the client reaction ability by integrating, analyzing and evaluating POS information in real time by connecting a store ordering system and an administer server on-line.

In general, the POS system is driven to calculate prices for merchandises and collect all information on the merchandises by scanning barcodes or OCR (Optical Character Recognition) tags attached to the merchandises.

However, since most POS systems are operated starting from a payment phase after decision of purchase by clients, even when a client enters a store after deciding merchandises to be purchased, it takes a long time to wait payment, make an order and deliver the merchandises to the client.

Therefore, there is a need of a more advanced sales management system which is capable of alleviating the above-mentioned client inconvenience. The present invention suggests a merchandise purchasing service which is capable of allowing a user to select a merchandise to be purchased through a merchandise purchasing application installed in its own terminal, detecting a signal output from a RF device installed in a store, and making payment for the selected merchandise when the user terminal acquires information related to the store.

SUMMARY OF THE INVENTION

Accordingly, it is an object of the present invention to provide a merchandise purchasing system and method which is capable of achieving prompter merchandise purchasing/payment processes by receiving a purchasing wish list in advance through a merchandise purchasing application installed in a user terminal, providing store information to the user terminal through a RF signal output from a RF device when a user enters a store, requesting a service server to progress a payment process if merchandises matching the store information exist on the purchasing wish list, and providing a result of payment from the service server to a POS terminal located in the store.

To achieve the above object, according to an aspect of the invention, there is provided a user terminal including: a storage unit which stores a purchasing wish list input from a user through a merchandise purchasing application; a device recognition unit which receives a radio frequency (RF) signal transmitted from a RF device located in a store, recognizes the RF device and acquires store information corresponding to the RF device; a merchandise details checking unit which checks whether or not a merchandise marching the store information exists on the stored purchasing wish list, based on the acquired store information; and a payment processing unit which causes an external service server to perform a payment process for the merchandise if the merchandise marching the store information exists on the stored purchasing wish list.

In one embodiment, the purchasing wish list may contain merchandise information selected by a user and store information related to the store selling merchandises, and the merchandise details checking unit may check whether or not the store information matching the acquired store information exists on the purchasing wish list.

In one embodiment, the purchasing wish list may contain merchandise information selected by a user, and the user terminal may further include a merchandise information search unit which accesses the service server to check merchandise information corresponding to the store information when the store information is acquired by the device recognition unit.

In one embodiment, the payment processing unit may display a payment pop-up window including merchandise information and store information in the payment process to check whether or not a user progresses payment for the merchandise.

In one embodiment, the user terminal may further include an application execution unit which executes the merchandise purchasing application, and the application execution unit may execute the merchandise purchasing application when the RF device is recognized by the device recognition unit.

In one embodiment, the service server may provide payment information to a POS terminal corresponding to the store information when the payment process is completed.

In one embodiment, the payment processing unit may receive and display a payment completion message from the service server when the payment process is completed.

According to another aspect of the invention, there is provided a method for purchasing a merchandise through a user terminal, including: storing a purchasing wish list input from a user through a merchandise purchasing application; receiving a radio frequency (RF) signal transmitted from a RF device located in a store, recognizing the RF device and acquiring store information corresponding to the RF device; checking whether or not a merchandise marching the store information exists on the stored purchasing wish list, based on the acquired store information; and causing an external service server to perform a payment process for the merchandise if the merchandise marching the store information exists on the stored purchasing wish list.

In one embodiment, the purchasing wish list may contain merchandise information selected by a user and store information related to the store selling merchandises, and the act of checking whether or not a merchandise marching the store information exists on the stored purchasing wish list may include checking whether or not the store information matching the acquired store information exists on the purchasing wish list.

In one embodiment, the purchasing wish list may contain merchandise information selected by a user, and the method may further include accessing the service server to check merchandise information corresponding to the store information after the store information is acquired.

In one embodiment, the act of performing a payment process may include displaying a payment pop-up window including merchandise information and store information in the payment process to check whether or not a user progresses payment for the merchandise.

According to another aspect of the invention, there is provided a non-transitory computer-readable storage medium storing a computer program including a set of instructions, when executed, arranged to cause a computer to implement the above-described method.

According to another aspect of the invention, there is provided a merchandise purchasing system including: a RF device which outputs a radio frequency (RF) signal containing store information; a user terminal which stores a purchasing wish list input from a user through a merchandise purchasing application, receives the RF signal transmitted from the RF device, checks whether or not a merchandise marching the store information acquired through the RF signal exists on the purchasing wish list, and requests for a payment process for the merchandise; a service server which performs a payment process for the user terminal and transmits payment information to a POS terminal located at a corresponding store; and a POS terminal which receives and displays the payment information.

According to the present invention, it is possible to provide a merchandise purchasing system and method which is capable of achieving prompter merchandise purchasing/payment processes by receiving a purchasing wish list in advance through a merchandise purchasing application installed in a user terminal, providing store information to the user terminal through a RF signal output from a RF device when a user enters a store, requesting a service server to progress a payment process if merchandises matching the store information exist on the purchasing wish list, and providing a result of payment from the service server to a POS terminal located in the store.

BRIEF DESCRIPTION OF THE DRAWINGS

The above and/or other aspects and advantages of the present invention will become apparent and more readily appreciated from the following description of the embodiments, taken in conjunction with the accompanying drawings of which.

DETAILED DESCRIPTION OF THE PREFERRED EMBODIMENT

Figure 1:
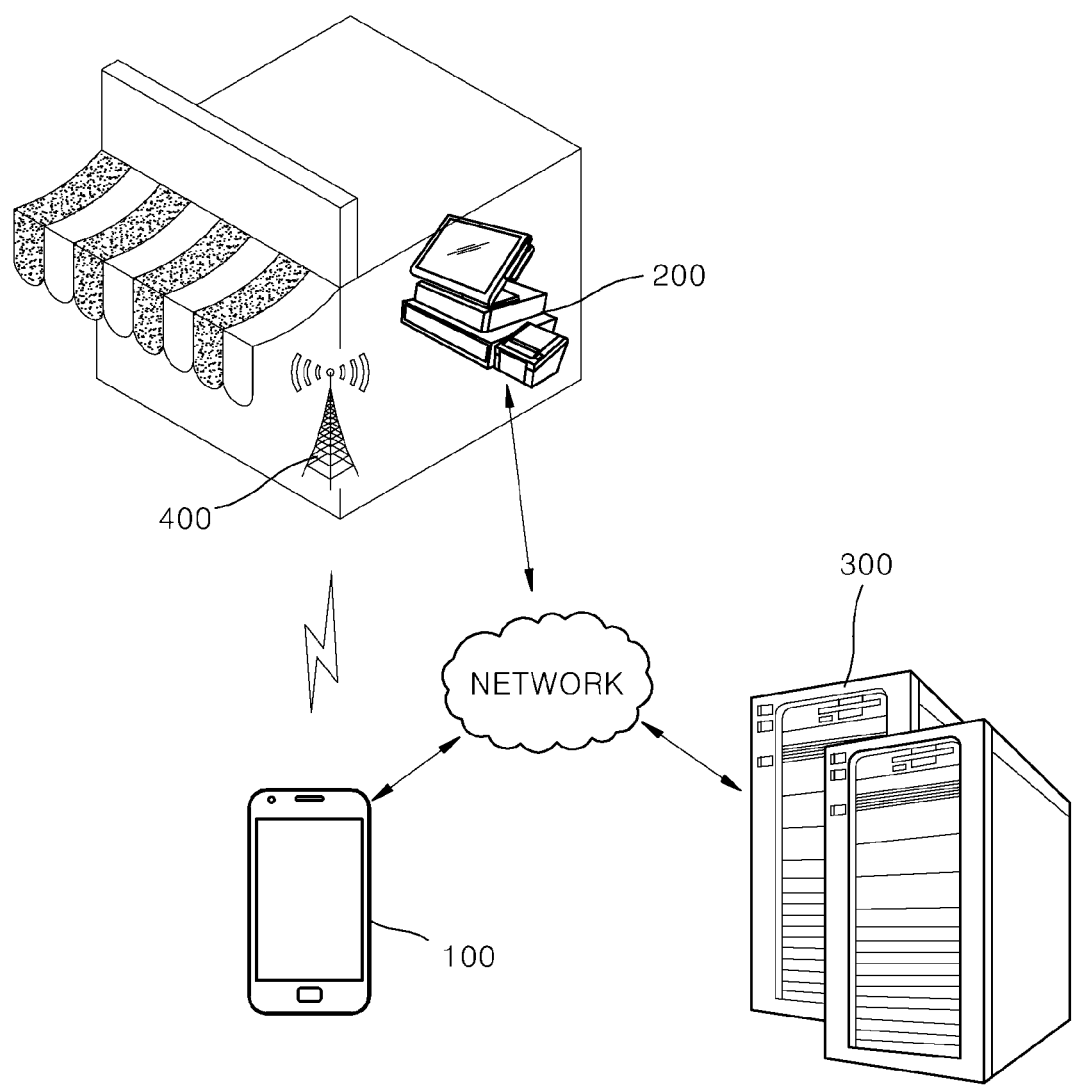
FIG. 1 is a schematic view of a merchandise purchasing system according to one embodiment of the present invention.

Terminologies used in the specification are used to explain particular embodiments and are not intended to limit the scope of the invention. In addition unless stated specifically otherwise in the specification, the terminologies used in the specification should be construed to have meanings generally understood by those skilled in the art but should not be construed to have unduly exaggerated or reduced meanings. In addition, even if the terminologies used in the specification are incorrect terminologies in expressing the idea of the present invention, these incorrect terminologies should be replaced with correct terminologies so that those skilled in the art can correctly understand the present invention. Moreover, general terms used in the specification should be construed as defined in the dictionary or according to the context and should not be construed to have unduly reduced meanings.

Hereinafter, preferred embodiments of the present invention will be described in detail with reference to the accompanying drawings so that those skilled in the art can easily practice the preferred embodiments. Throughout the drawings, the same or similar elements are denoted by the same reference numerals and explanation of which will not be repeated for the purpose of brevity of description. In the following detailed description of the present invention, concrete description on related functions or constructions will be omitted if it is deemed that the functions and/or constructions may unnecessarily obscure the gist of the present invention. Accordingly, embodiments described in the specification and elements shown in the drawings are illustrative only and do not cover all of the technical ideas of the present invention. It should be, therefore, understood that these embodiments and elements may be replaced with different equivalents and modifications at the point of time of filing the present application.

FIG. 1 is a schematic view of a merchandise purchasing system according to one embodiment of the present invention.

Referring to FIG. 1, a merchandise purchasing system according to one embodiment of the present invention includes a user terminal 100, a service server 300, a merchandise information providing apparatus 200 and a RF device 400. The user terminal 100, the service server 300 and the merchandise information providing apparatus 200 can exchange information through a network and the RF device 400 can broadcast RF signals in a local area through local wireless communication techniques known in the art.

The user terminal 100 may be implemented with a smart phone, a tablet PC, a PDA, a laptop PC or the like which is known in the art and is capable of performing data communication through a wired/wireless network. The user terminal 100 can equip a variety of applications known in the art and access a platform providing the applications to exchange information with the platform. In one embodiment of the present invention, the user terminal 100 can install a merchandise purchasing application to receive a merchandise purchasing service in association with the service server 300.

In the present invention, the merchandise purchasing application can provide a user interface to allow a user to select various merchandises, create a purchasing wish list at a request from the user, and access the service server 300 via a network to receive store information and merchandise information from the service server 300, while supporting an on-line payment function.

The configuration of the user terminal 100 will be described in more detail later with reference to FIGS. 2, 3A and 3B.

The service server 300 provides a merchandise purchasing service for a number of user terminals 100 joining in the service and the merchandise information providing apparatus 200 at a store joining in the service. The service server 300 can receive information on stores joining in the service and information on kinds, prices and stocks of merchandises in sales from the merchandise information providing apparatus 200 and construct a database based on the received information.

In addition, the service server 300 can provide the merchandise purchasing application to the user terminal 100. When the user terminal 100 accesses the service server 300 through the merchandise purchasing application, the service server 300 can provide the store information and the merchandise information to the user terminal 100 and perform a payment process at a request from the user terminal 100. In this case, the service server 300 can perform the payment process of the user terminal 100 in association with payment servers (not shown) of a bank and a credit card company.

The RF device 400 is installed in a store and outputs a RF signal in a broadcasting manner. The RF device 400 can employ known communication schemes such as Bluetooth, Zigbee, Wi-Fi, sound communication, visible light communication and the like, with no limitation, as long as these communication schemes are local wireless communication schemes having intensity sufficient to cover the store. The RF signal output from the RF device 400 may contain the store information related to the store at which the RF device 400 is located. The store information may include an identifier provided to each store by the service server 300. The RF device 400 may be provided to be integrated with the merchandise information providing apparatus 200 or may be provided to be physically separated from the merchandise information providing apparatus 200. The RF device 400 need not be separately connected to a network, except broadcasting the RF signal. If the RF device 400 is separated from the merchandise information providing apparatus 200, an interface with the merchandise information providing apparatus 200 is not needed.

The merchandise information providing apparatus 200 is connected to the service server 300 via a network and can receive merchandise information and payment information selected by the user terminal 100. The merchandise information providing apparatus 200 may be typically implemented with a POS (Point Of Sales) terminal used in a store. In the following description, the merchandise information providing apparatus 200 and the POS terminal may be exchangeable. The merchandise information providing apparatus 200 may include a display function to display merchandises purchased and paid by the user terminal 100 and allow a clerk of the store to hand over the merchandises to the user through the displayed information.

The configuration of the merchandise information providing apparatus 200 will be described in more detail later with reference to FIGS. 4 and 5.

Figure 2:
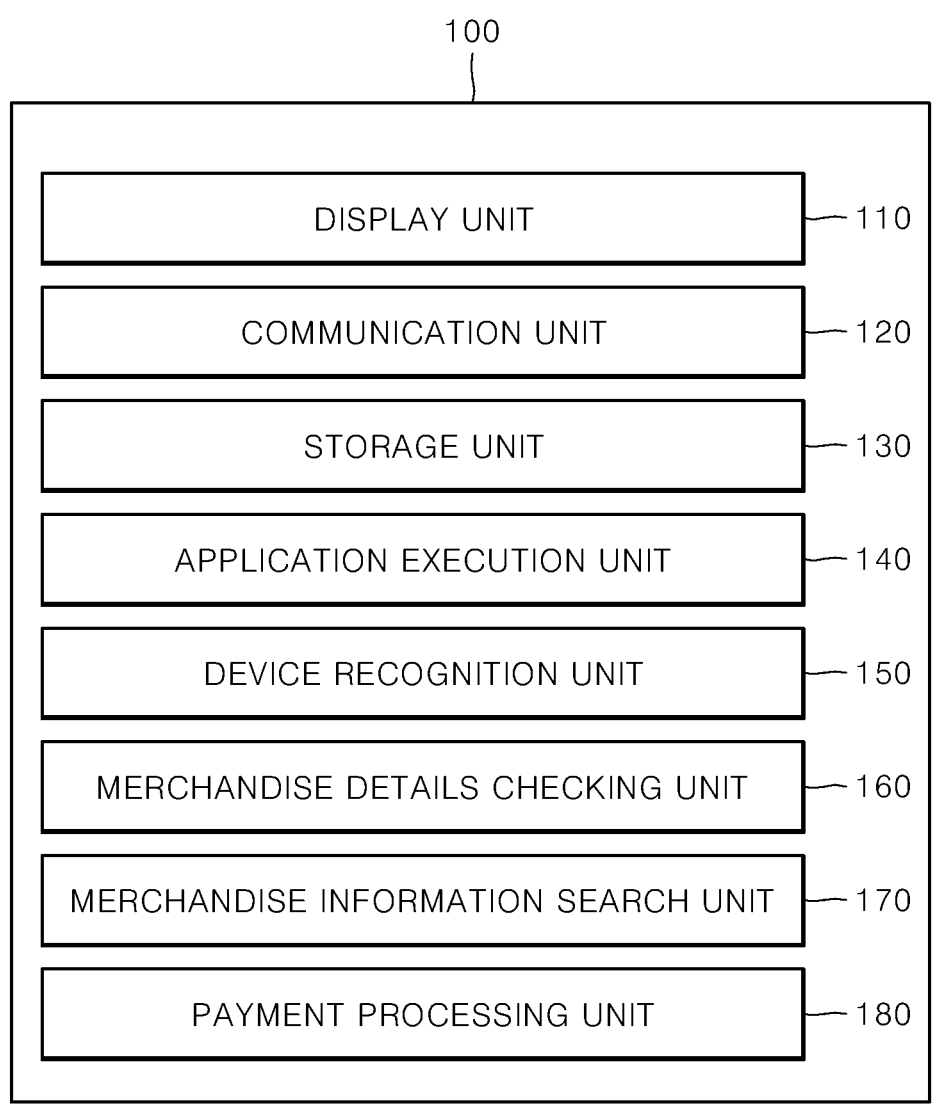
FIG. 2 is a block diagram of a user terminal according to one embodiment of the present invention.

FIG. 2 is a block diagram of the user terminal 100 according to one embodiment of the present invention.

Referring to FIG. 2, the user terminal 100 may include a display unit 110, a communication unit 120, a storage unit 130, an application execution unit 140, a device recognition unit 150, a merchandise details checking unit 160, a merchandise information search unit 170 and a payment processing unit 180. In some embodiments, some of the shown units may be omitted without causing any difficulty in implementing the idea of the present invention.

The display unit 110 displays an image implemented on the user terminal 100. The following description is focused on the merchandise purchasing service according to the present invention. The display unit 110 can display a user interface for executing the merchandise purchasing application to generate a purchasing wish list, a payment pop-up window for payment process, a payment completion message transmitted from the service server 300 when payment is completed, and so on. The display unit 110 may be implemented with display panels known in the art, such as OLED (Organic Light Emitting Diode), LCD (Liquid Crystal Display), PDP (Plasma Display Panel), FD (Flexible Display) or the like, and may include a touch pad for receiving a touch input from a user.

The communication unit 120 communicates with the service server 300 via a wireless network. As will be described later, data exchanged between the user terminal 100 and the service server 300 can be transmitted/received through the communication unit 120.

The storage unit 130 is implemented with a nonvolatile memory known in the art and stores information, such as the purchasing wish list and so on, input through the merchandise purchasing application. In addition, the storage unit 130 may store data stored in messages, phonebooks and other application provided in the user terminal 100.

The application execution unit 140 performs a management function such as execution, update and so on of an application received from the service server 300. In the present invention, the application execution unit 140 can execute the merchandise purchasing application when a user enters an application execution key to generate the purchasing wish list or the device recognition unit 150 detects a RF signal transmitted from the RF device 400.

When the user of the user terminal 100 wishes to purchase a particular merchandise, the user can generate a purchasing wish list by executing the merchandise purchasing application before the user arrives at a store. When menus from which purchase lists can be selected in the merchandise purchasing application is displayed, the user can select at least one of many merchandises and the purchasing wish list can be displayed when the designation of merchandises is completed.

Figure 3A:
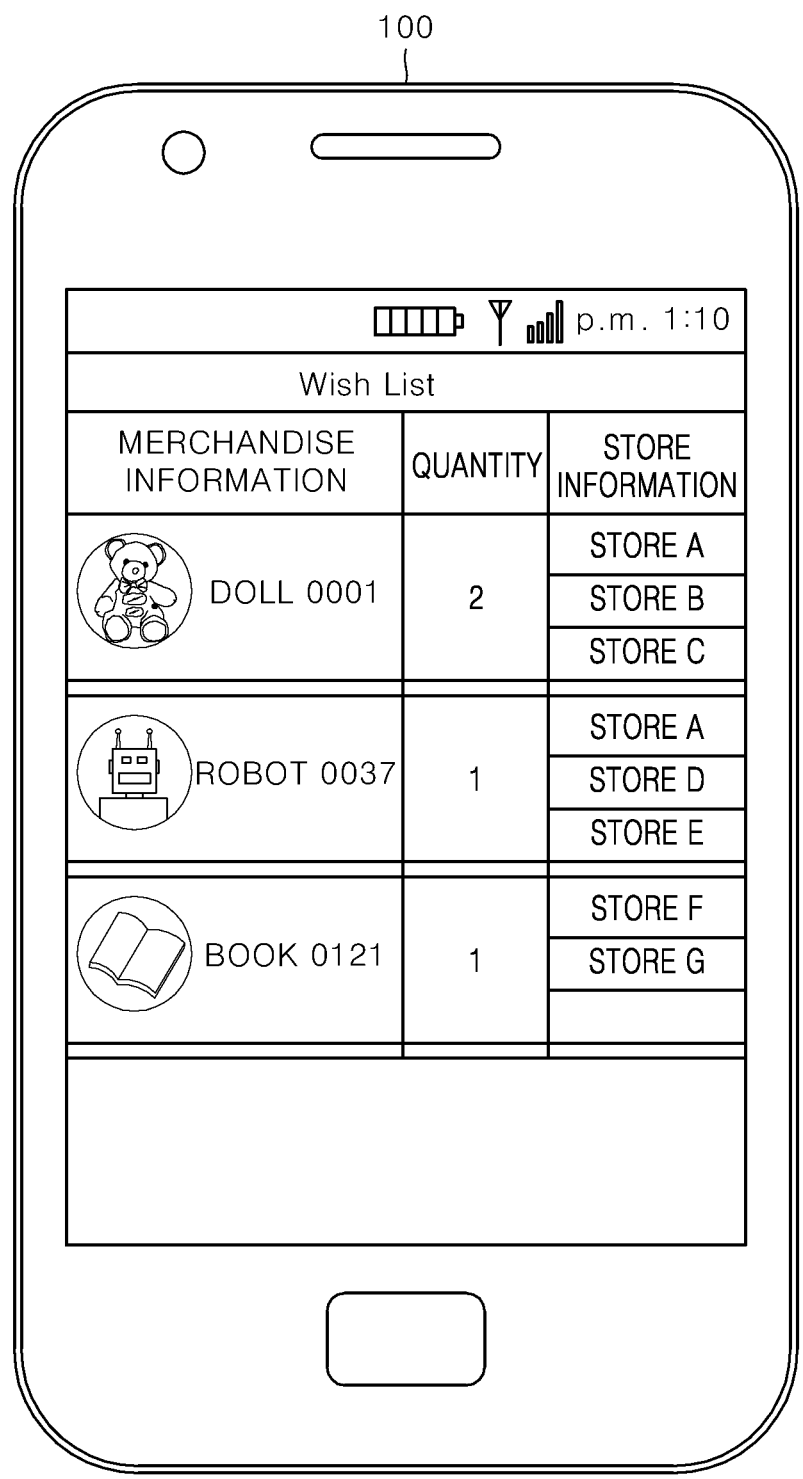
FIGS. 3A and 3B are views showing one example of a screen displayed on the user terminal.
Figure 3B:
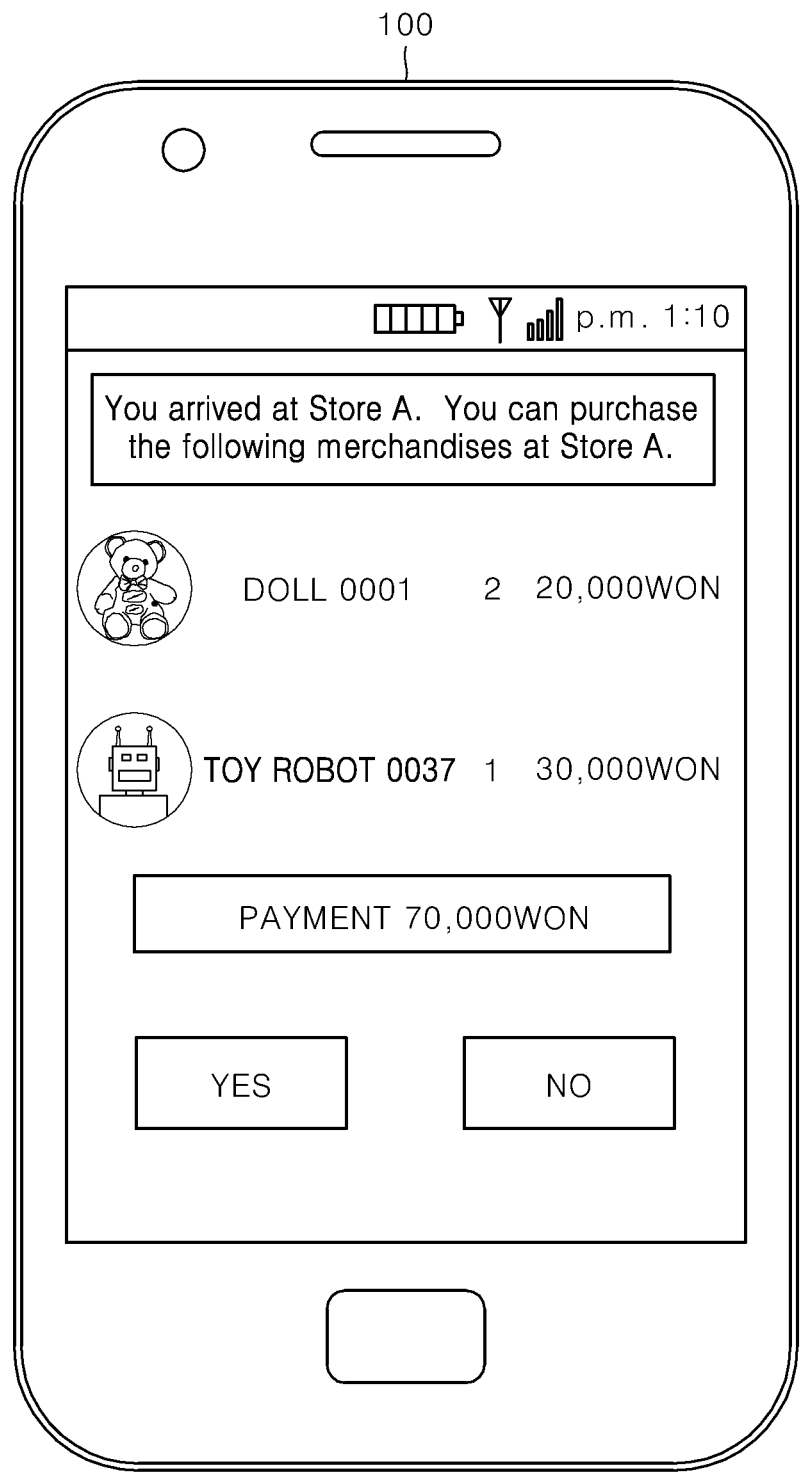

As shown in FIG. 3A, the purchasing wish list can be displayed to include merchandise information and purchase wish quantity selected by the user and store information related to stores selling various merchandises.

The merchandise information may include names and brief images of merchandises, and merchandise IDs set for the merchandises. The service server 300 can store information of merchandises sold in various stores joining in the merchandise purchasing service in association with store IDs and merchandise IDs. When the user selects a particular merchandise on the merchandise purchasing application, the service server 300 can provided the user with store information related to a store selling the selected merchandise in association with the merchandise information. As one example, when the user selects a particular doll, an ID (doll0001) of the doll, stores (store A, store B and store C) selling the doll, and selected quantities (two pieces) can be displayed on the purchasing wish list.

The purchasing wish list shown in FIG. 3A is illustrative only. Additional information may be added to the list or some information may be deleted from the list. For example, the store information corresponding to the merchandise information may not be contained in the list, in which case there is a need of a separate process to check whether or not the store sells the merchandises on the purchasing wish list when the store information is acquired, as will be described later.

The device recognition unit 150 receives the RF signal transmitted from the RF device 400 and recognizes the RF device 400. As described earlier, the RF device 400 is installed in a store and broadcasts a RF signal in a broadcasting manner through known communication schemes such as Bluetooth, Zigbee, Wi-Fi, sound communication, visible light communication and the like. When the user terminal 100 enters the store and is located within a specified distance from the RF device 400, the device recognition unit 150 can receive the RF signal transmitted from the RF device 400. The RF signal output from the RF device 400 may include the store information related to the store at which the RF device 400 is located. The store information may include an identifier provided to each store by the service server 300.

Based on the acquired store information, the merchandise details checking unit 160 checks whether or not a merchandise matching the store information exists on the stored purchasing wish list.

In one embodiment of the present invention, if the merchandise information and the store information related to the store selling the merchandise are contained in the purchasing wish list, the merchandise details checking unit 160 checks whether or not the store information matching the merchandise information contained in the RF signal received from the RF device 400 is contained in the purchasing wish list. For example, as shown in FIG. 3A, when the user generates the purchasing wish list and enters the store A to acquire the store information, it can be checked that dolls and toy robots among the selected merchandises including dolls, toy robots and books are sold in the store A.

The merchandise information search unit 170 accesses the service server 300 to check the merchandise information corresponding to the store information. As described earlier, the service server 300 can receive information on stores joining in the service and information on kinds, prices and stocks of merchandises in sales from the merchandise information providing apparatus 200 and construct a database based on the received information. The merchandise information search unit 170 can acquire the merchandise information related to merchandises being sold in the stores among the information stored in the database of the service server 300.

In particular, the purchasing wish list may not contain the store information of the merchandises, as opposed to those shown in FIG. 3A. In this case, the merchandise information search unit 170 can acquire information related to a number of merchandises sold in the stores from the service server 300 and the merchandise details checking unit 160 can check whether or not the merchandises on the purchasing wish list are sold in the stores, based on the information acquired by the merchandise information search unit 170.

When it is checked by the merchandise details checking unit 160 that the merchandise selected through the purchasing wish list exists in the store at which the user is located, the payment processing unit 180 progresses a payment process for the merchandise. At this time when the merchandise exists, preregistered credit card information or bitcoins may be used to automatically pay for the merchandise.

As opposed to this, the user terminal 100 can display a payment pop-up window for progressing payment for the merchandise on the display unit 110. As shown in FIG. 3B, a list of merchandises which can be purchased at the store and payments for the merchandises are displayed on the display unit 110 and the payment can be performed when the user selects a payment icon.

When the payment process is completed, the service server 300 transmits a payment completion message to the user terminal 100 with SMS (Short Message Service), MMS (Multi Message Service), a push message or the like and transmits a result of payment to the merchandise information providing apparatus 200.

Then, the merchandise information providing apparatus 200 displays the merchandise and the payment result to allow a clerk of the store to hand over the merchandise to the user.

With the above-described user terminal 100 according to the present invention, the purchasing wish list is received in advance through the merchandise purchasing application installed in the user terminal 100 and, when user enters a store, the merchandise information is provided to the user terminal 100 through the RF signal output from the RF device 400. If a merchandise matching the store information exists on the purchasing wish list, the service server 300 is requested to perform a payment process and provides a result of payment to the POS terminal in the store. As a result, a more convenient merchandise purchasing service can be provided without requiring for a user to wait in a store for merchandise purchase, with no need of prepayment before merchandise delivery, and with no need of separate execution of the application when the user enters the store.

Figure 4:
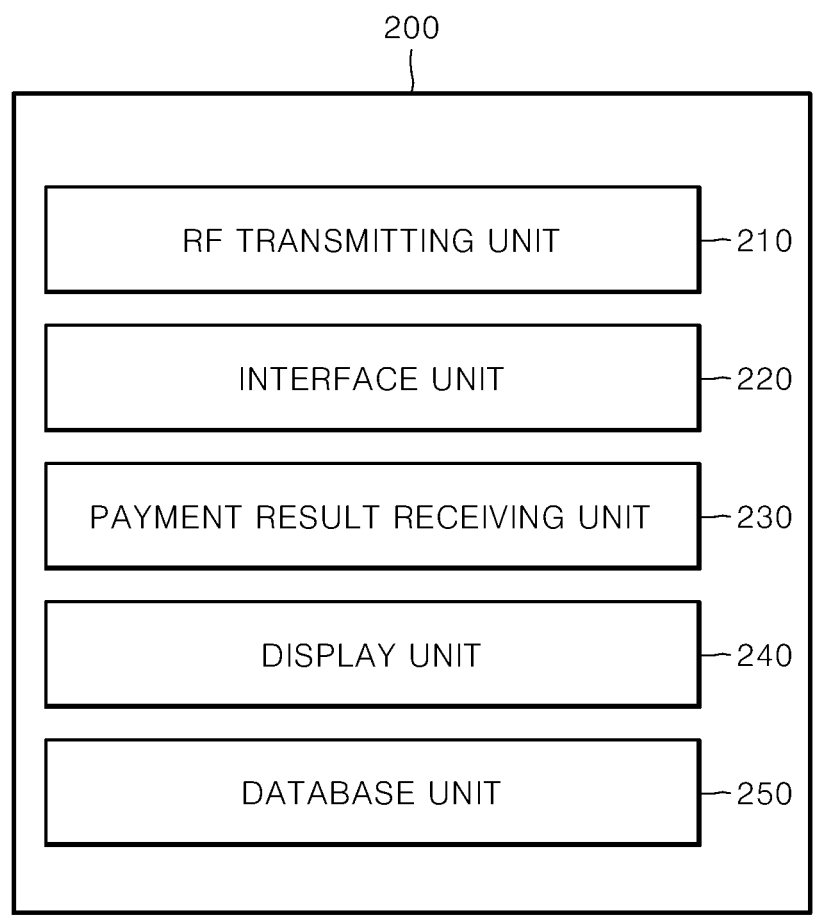
FIG. 4 is a block diagram of a merchandise information providing apparatus according to one embodiment of the present invention.
Figure 5:
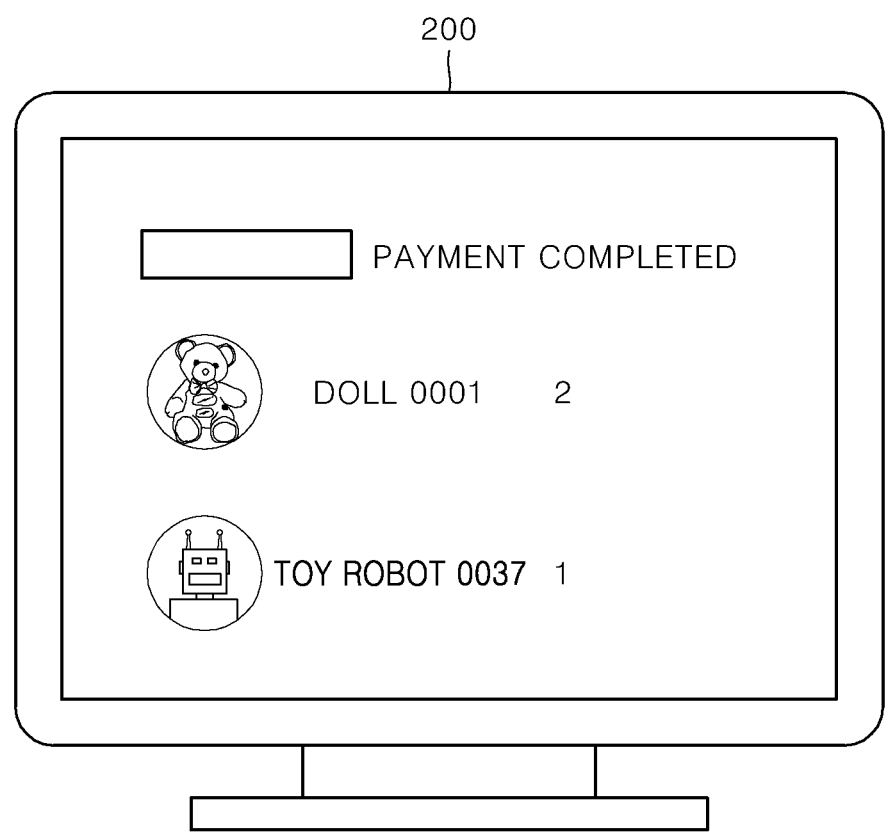
FIG. 5 is a view showing one example of a screen displayed on the merchandise information providing apparatus.

FIG. 4 is a block diagram of the merchandise information providing apparatus 200 according to one embodiment of the present invention.

Referring to FIG. 4, the merchandise information providing apparatus 200 may include a RF transmitting unit 210, an interface unit 220, a payment result receiving unit 230, a display unit 240 and a database unit 250. In some embodiments, some of the shown units may be omitted without causing any difficulty in implementing the idea of the present invention. The merchandise information providing apparatus 200 may be provided in a certain region in a store and may be implemented with a POS (Point Of Sales) terminal generally used in the store.

The RF transmitting unit 210 transmits a RF signal containing store information to the user terminal 100. The RF transmitting unit 210 performs the function of the RF device 400 described earlier with reference to FIG. 1 and may be integrated with the merchandise information providing apparatus 200 or may be physically separated from the merchandise information providing apparatus 200. The RF signal transmitted from the RF transmitting unit 210 may contain store information for identifying the store.

The interface unit 220 communicates with the service server 300 via a network. As will be described later, data exchanged between the merchandise information providing apparatus 200 and the service server 300 may be transmitted/received through the interface unit 220.

The payment result receiving unit 230 receives a result of payment for a merchandise by the user terminal 100 from the service server 300. As described earlier, the user terminal 100 receives a purchasing wish list in advance from the user through the merchandise purchasing application, searches for a merchandise which can be purchased in the store, based on the store information contained in the RF signal transmitted from the RF transmitting unit 210, and performs a payment process for the merchandise in association with the service server 300. When the payment process for the merchandise is completed, the service server 300 transmits a result of payment to the merchandise information providing apparatus 200.

The database unit 250 can store a variety of information, such as the result of payment and so on, received from the service server 300.

The display unit 250 displays the payment result received in the payment result receiving unit 230. As shown in FIG. 5, identifiers such as client' telephone numbers, names, IDs and so on and kinds of purchased merchandises can be displayed on the display unit 250.

The purchased merchandises may be handed over to the user by a clerk based on the displayed information.

Figure 6:
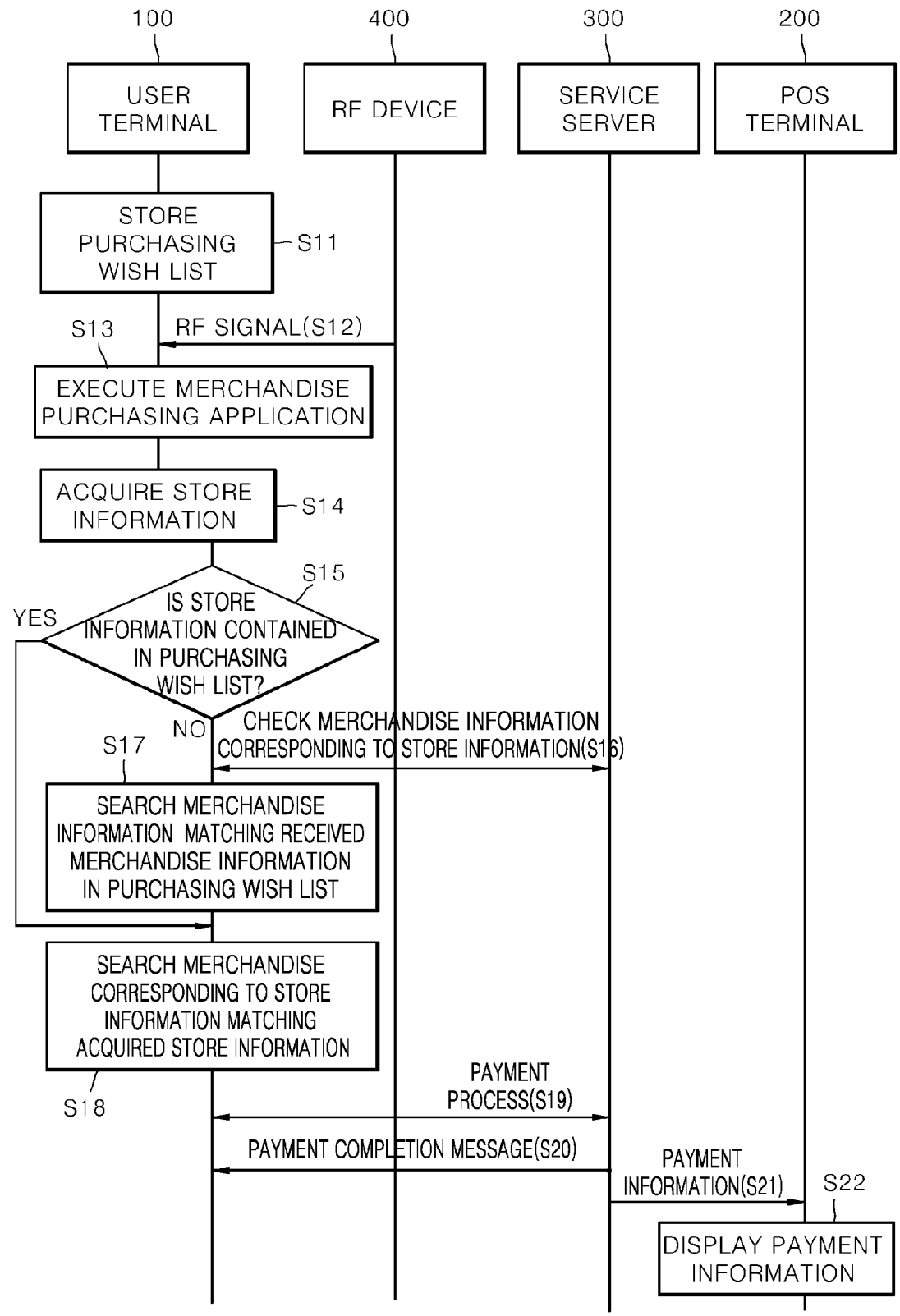
FIG. 6 is a flow diagram of a merchandise purchasing service method according to one embodiment of the present invention.

FIG. 6 is a flow diagram of a merchandise purchasing method according to one embodiment of the present invention.

Referring to FIG. 6, the merchandise purchasing method is embodied through the user terminal 100, the service server 300, the POS terminal and the RF device 400. In the following description, only a simple processor for merchandise purchasing process will be described and explanation about portions identical to those described with reference to FIGS. 1 to 5 will be omitted.

Prior to merchandise purchase, a user executes a merchandise purchasing application installed in the user terminal 100 to generate a purchasing wish list (S11). The purchasing wish list may include merchandise information and purchase wish quantity selected by the user and store information related to stores selling various merchandises, as described earlier with reference to FIG. 3A. In one embodiment, the store information may be omitted.

When the user of the user terminal 100 enters a particular store, the user terminal 100 can receive a RF signal output from the RF device 400 (S12). The RF device 400 broadcasts the RF signal in a broadcasting manner through known communication schemes such as Bluetooth, Zigbee, Wi-Fi, sound communication, visible light communication and the like. When the user terminal 100 enters the store and is located within a specified distance from the RF device 400, the user terminal 100 can receive the RF signal transmitted from the RF device 400. The RF signal may include the store information related to the store at which the RF device 400 is located. The store information may include an identifier provided to each store by the service server 300.

Upon receiving the RF signal, the user terminal 100 executes the merchandise purchasing application (S13) and acquires the store information contained in the RF signal (S14). That is, even when the user does not execute the merchandise purchasing application with a separate manipulation, the user terminal 100 automatically executes the merchandise purchasing application upon receiving the RF signal when the user enters the store.

In one embodiment, if the store information is contained in the purchasing wish list, the user terminal 100 searches the merchandise information corresponding to the store information matching the acquired store information (S18), as described earlier with reference to FIG. 3A. In another embodiment, if only the merchandise information is contained in the purchasing wish list, without containing the store information, the user terminal 100 accesses the service server 300 and receives the merchandise information corresponding to the store information, i.e., information related to merchandises sold in the store at which the user is located (S16). Thereafter, the user terminal checks whether or not the merchandise information matching the merchandise information acquired in the service server 300 exists on the purchasing wish list (S17).

If the merchandise sold in the store exists on the purchasing wish list, a payment process for the merchandise is progressed (S19). At this time, preregistered credit card information or bitcoins may be used to automatically pay for the merchandise. In addition, the user terminal 100 can display a payment pop-up window for progress of the payment process for the merchandise and can progress the payment process if the user approves the payment.

When the payment process is completed, the service server transmits a payment completion message to the user terminal 100 (S20) and provides payment information to the POS terminal 200 (S21).

The POS terminal 200 displays the payment information (S22) to allow a clerk of the store to hand over the paid merchandise to the user, as described earlier with reference to FIG. 5.

As described above, according to the present invention, the purchasing wish list is received in advance through the merchandise purchasing application installed in the user terminal 100 and, when user enters a store, the merchandise information is provided to the user terminal 100 through the RF signal output from the RF device 400. If a merchandise matching the store information exists on the purchasing wish list, the service server 300 is requested to perform a payment process and provides a result of payment to the POS terminal in the store. As a result, a more convenient merchandise purchasing service can be provided without requiring for a user to wait in a store for merchandise purchase, with no need of prepayment before merchandise delivery, and with no need of separate execution of the application when the user enters the store.

From the above description, it can be understood by those skilled in the art that the present invention can be practiced in different forms without departing from the spirit and scope of the invention. It should be, therefore, understood that the above embodiments are not limitative but just illustrative for all purposes.

For example, the user terminal according to the present invention can store information in a memory which may be a computer-readable medium. In one implementation, the memory may be a volatile memory unit. In another implementation, the memory may be a nonvolatile memory unit. The memory may include, but is not limited to, a hard disk, an optical disk or other mass storages.

The user terminal 100 or the service server 300 can be implemented by instructions that, when executed, cause one or more processors to perform the above-described functions and processes. Examples of such instructions may include script instructions such as JavaScript, ECMAScript and the like, executable codes, or other instructions stored in a computer-readable medium.

Implementations of the functional operations and subject matters described in the specification may be implemented with different types of digital electronic circuits, computer software, firmware or hardware including the structures and equivalents thereof disclosed in the specification, or one or more combinations thereof. The implementations of the subject matters described in the specification may be implemented as one or more computer program products, in other words, as one or more modules related to computer program instructions encoded to control or execute the operation of the devices of the present invention.

Examples of computer-readable media may include a machine-readable storage device, a machine-readable storage substrate, a memory device, a composition of material having an effect on a machine-readable electromagnetic signal, or one or more combinations thereof.

As used herein, the "system" or "apparatus" encompasses all instruments, devices and machines for data processing, including programmable processors, computers or multiprocessors. A processing system may include, in addition to hardware, codes forming execution environments for computer programs at a request, such as codes, protocol stacks, database management systems, operating systems, which construct processor firmware, or one or more combinations thereof.

Computer programs (also known as programs, software, software applications, scripts or codes) loaded on the device of the present invention and executed to implement the method of the present invention may be written in any forms of programming languages including compiled or interpreted languages and a priori or procedural languages and may be deployed in any forms including stand-alone programs, modules, components, subroutines or other units suitable for use in computing environments. The computer programs do not necessarily correspond to files of a file system. The programs may be stored in a single file provided for a requested program, multiple interoperating files (for example, files storing one or more modules, subprograms or some of codes), or a portion of file retaining other programs and data (for example, one or more scripts stored in a markup language document). The computer programs may be located in one site or distributed over a plurality of sites so that the programs can be executed on multiple computers interconnected by a communication network or a single computer.

Examples of the computer-readable medium suitable to store computer program instructions and data may include all types of nonvolatile memories, media and memory devices, including semiconductor memories such as EPROM, EEPROM and flash memories, magnetic disks such as an internal hard disk and external disk, magneto-optical disks, CD-ROM disks and DVD-ROM disks. Processors and memories may be supplemented by or integrated into a special purpose logic circuit.

Although details of various particular implementations are set forth in the specification, these details are not intended to limit the scope of the invention or subject matters but should be understood as descriptions for features unique to particular embodiments of the present invention. Features described in the context of individual embodiments in the specification may be implemented in combination in a single embodiment. Conversely, various features described in the context of single embodiment may be implemented individually or in any proper sub combinations in multiple embodiments. Further, although features are operated in particular combinations and may be delineated as initially claimed so, one or more features may be excluded from the claimed combinations in some cases and the claimed combinations may be changed to sub combinations or modifications thereof.

In addition, although operations are shown in specific order in the drawings, it should not be understood that these operations have to be performed in the specific order or a sequential manner shown to obtain desirable results or all operations shown have to be performed. In some cases, multitasking and parallel processing may be beneficial. In addition, it should not be understood that separation of various system components in the above embodiments is required for all embodiments but it should be understood that program components and systems described in the above embodiments may be integrated into a single software product or may be packaged into multi-software products.

The above description is not intended to limit the present invention to detailed terms set forth herein. While the present invention has been particularly shown and described with reference to exemplary embodiments thereof, it will be understood by those skilled in the art that various changes in form and details may be made therein without departing from the spirit and scope of the present invention. The exemplary embodiments are provided for the purpose of illustrating the invention, not in a limitative sense. Thus, it is intended that the present invention covers the modifications and variations of this invention provided they come within the scope of the appended claims and their equivalents.

INDUSTRIAL APPLICABILITY

According to the present invention, it is possible to provide a merchandise purchasing system and method which is capable of achieving prompter merchandise purchasing/payment processes by receiving a purchasing wish list in advance through a merchandise purchasing application installed in a user terminal, providing store information to the user terminal through a RF signal output from a RF device when a user enters a store, requesting a service server to progress a payment process if merchandises matching the store information exist on the purchasing wish list, and providing a result of payment from the service server to a POS terminal located in the store. As a result, a more convenient merchandise purchasing service can be provided without requiring for a user to wait in a store for merchandise purchase, with no need of prepayment before merchandise delivery, and with no need of separate execution of the application when the user enters the store. The present invention has industrial applicability since it has sufficient commercial availability and operation performance and can be practiced in reality.

What is claimed is:
1. A user terminal, comprising:
a display unit configured to provide a user interface for a user of the user terminal to select at least one product of products displayed in the user interface;
a device recognition unit configured to receive a radio frequency (RF) signal transmitted from a RF device located in a particular store, the RF signal being associated with the particular store;
a processor that is configured to:
   obtain, from a service server, merchandise information identifying a plurality of products,
   obtain, from the service server, store information identifying one or more stores associated with particular products, wherein obtaining store information comprises:
      accessing, through a communication unit over a network, the service server to receive the store information,
   receive, through the display unit from the user of the user terminal, a user input to select one or more products that the user is interested in from products of the plurality of products displayed in the user interface,
   in response to receiving the user input from the user, generate, based on the merchandise information and the store information, a purchasing list identifying (i) the one or more products that the user is interested in and (ii) for each of the one or more products, one or more stores that are associated with the product,
store the purchasing list in a storage unit of the user terminal,
based on the RF signal, determine whether the particular store is identified in the purchasing wish list,
in response to determining that the particular store is identified in the purchasing list, identifying one or more products, from the purchasing list, that are associated with the particular store, and
processing a payment for the one or more products identified from the purchasing list.

2. The user terminal according to claim 1,
wherein the processor is configured to:
cause the display unit to display a graphic user interface presenting the one or more products and the particular store to obtain a user confirmation for the payment.

3. The user terminal according to claim 1,
wherein, in a state in which the payment is completed, the processor is configured to:
receive a payment completion message from the service server, and
display the received payment completion message on the display unit.

4. A method comprising:
obtaining, from a service server, merchandise information identifying a plurality of products;
obtaining, from the service server, store information identifying one or more stores associated with particular products, wherein obtaining store information comprises:
accessing, through a communication unit over a network, the service server to receive the store information;
receiving user input from a user of a user device to select one or more products that the user is interested in from the plurality of products;
in response to receiving the user input from the user, generating, based on the merchandise information and the store information, a purchasing list identifying (i) the one or more products that the user is interested in and (ii) for each of the one or more products, one or more stores that are associated with the product;
storing, by the processor, the received purchasing list into a storage unit of the user device;
receiving, from an RF device that is located in a particular store, an RF signal associated with the particular store;
based on the RF signal, determining whether the particular store is identified in the purchasing list;
in response to determining that the particular store is identified in the purchasing list, identifying one or more products, from the purchasing list, that are associated with the particular store; and
processing a payment for the one or more products identified from the purchasing list.

5. The method according to claim 4, wherein processing a payment for the one or more products identified from the purchasing list comprises:
displaying a graphic user interface presenting the one or more products and the particular store to obtain a user confirmation for the payment.

* * * * *